Figure 1:
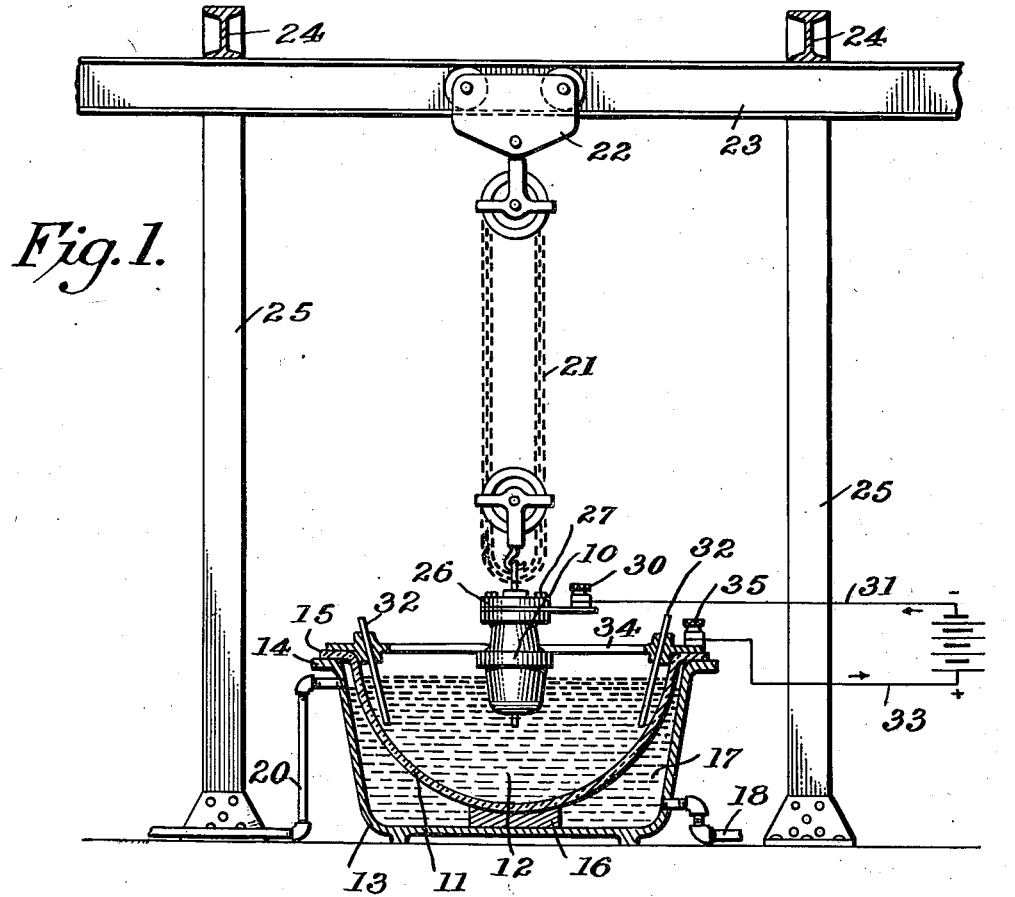

INVENTOR
Rowland D. Smith.
BY
ATTORNEYS

Patented Oct. 29, 1935

2,018,814

UNITED STATES PATENT OFFICE 2,018,814

GLASS WORKING IMPLEMENT

Rowland D. Smith, Corning, N. Y., assignor to Corning Glass Works, Corning, N. Y., a corporation of New York Application November 21, 1925, Serial No. 70,635

2 Claims. (Cl. 49—65)

This invention relates to the art of shaping molten glass, and more particularly to the provision of suitable implements for use therein.

Among the objects of this invention are the provision of mold implements which will resist oxidation and scaling when subjected to high temperatures and repeated heated and cooling, to produce such articles more cheaply than has heretofore been possible without sacrificing their efficiency, and a process of and apparatus for carrying out these objects.

It has previously been customary to use cast iron for both plungers and molds, but this material is open to the objection that the molds and plungers rapidly oxidize and have to be stoned off to remove the oxidation. The intervals at which this is necessary vary with different shapes and sizes of mold implements, and the heat and character of the glass being worked, but is frequently necessary at the end of each shift when working some kinds of glass, such as glass of the type set forth in Letters Patent 1,304,623, granted to Sullivan and Taylor. Reconditioning takes from a half hour to four hours, and is not only expensive in itself, but requires frequent changing of the mold implements with consequent loss of time, often damages them, causes them to wear out more rapidly, and necessitates a larger supply of similar molds. Furthermore, the oxidation, which forms on blow irons, scales off and passes into the cullet, thus rendering the latter less suitable for remelting.

Ordinary cold rolled steel has been tried for glass shaping implements but was found to be unsatisfactory, since it is subject to both oxidation and scaling. Certain special steels, including chromium and nickel alloys, have been used for mold materials, but these are expensive, are hard to cast into the proper form, and are subject to oxidation. Furthermore, if the entire mold is made of a chromium alloy steel the heat conductivity of the mold parts is reduced, causing them to run hot and stick to the glass. Such molds also scale when subjected to a high temperature. While molds of such material would have a relatively long life, the defects mentioned decrease their suitability, and as a consequence special steels are used mainly for the insert which surrounds the mold valve.

It has heretofore been suggested that a layer of nonoxidizable material be welded to the interior of an iron mold, but this is expensive and also unsatisfactory on account of the difficulty of doing this with molds of other than simple construction.

My invention consists in electroplating glass working implements, such as molds, plungers, punties and blow irons, which are made out of metal of otherwise suitable characteristics and properties, with a coating of chromium. This protects the metal from oxidation and increases the resistance to scaling, without reducing the heat conductivity of the metal forming the body of the implement. I have found that suitable materials for the body of the mold or plunger, as well as for the punty or blow iron, are cold rolled steel, carbon steel, and cast iron, these being relatively cheap and possessing high heat conductivity, although other materials may be used.

Figure 2:
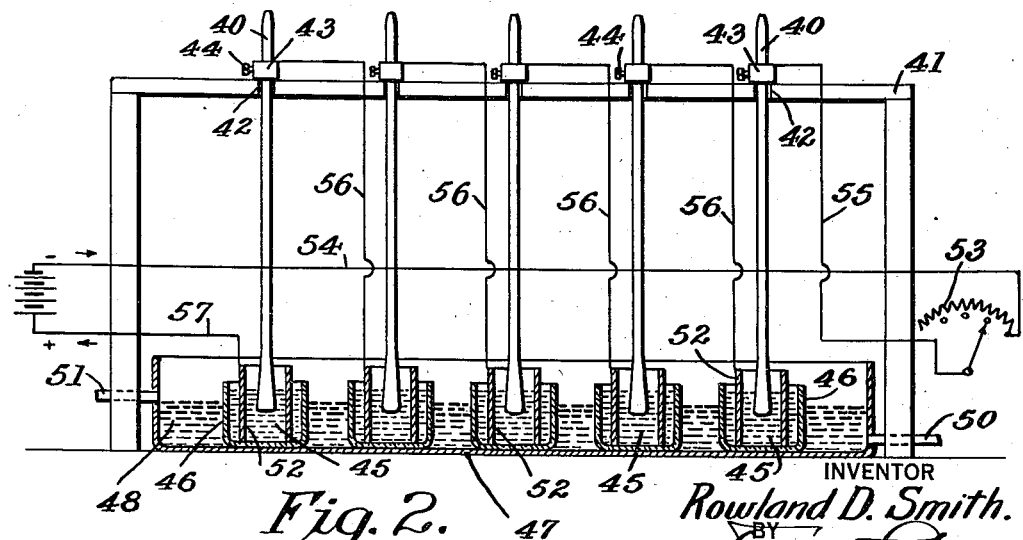

The electroplating may be carried out in any well-known manner, but by way of example I have set forth my preferred method of and apparatus for doing this in the following specification, taken in connection with the accompanying drawing, in which:

Fig. 1 is a vertical section through an apparatus for carrying out my invention, as applied to molds, plungers, and other parts of relatively large cross-section, and Fig. 2 is a vertical section through a corresponding apparatus for the treatment of punties and blow irons.

Referring particularly to Fig. 1, 10 designates the plunger or other article which is to be plated, and 11 designates a container, preferably of low expansion heat resisting glass, containing an electroplating solution 12. The container 11 may be supported in any desired manner, but is herein shown as being supported in a tub 13 of any suitable material, as wood or metal, the tub having a circumferential flange 14 to co-operate with a similar flange 15 on the container 11. Additional support is furnished by a steadying block 16, interposed between the bottom of container 11 and the tub 13. The latter serves the additional function of providing a water bath 17 to prevent the overheating of container 11, and for this purpose is provided with inlet and outlet pipes 18 and 20 respectively.

The plunger 10 may be supported in any desired manner but, inasmuch as many plungers are quite heavy, it is convenient to have means for easily raising and lowering these members into and out of the electrolyte. I have therefore provided a chain hoist 21 which is attached to a roller carriage 22, on a horizontal beam 23, that is supported from a frame work comprising a pair of cross beams 24 and four uprights 25. The chain hoist is provided with a supporting block 26, to which the plunger is attached by bolts 27, to permit its easy attachment and detachment.

Electric current, from any suitable source, is conveyed to a cathode, comprising a binding post 30 and the plunger 10, by a conductor 31, and to a series of anodes 32 by a conductor 33. I prefer to utilize a series of four lead or chromium anodes 32, preferably the latter, and these are supported so that they will dip into the electrolyte by the aid of a ring 34, which rests on the flange of the container 11. Conductor 33 is connected to the ring 34 by a binding post 35.

Referring to Fig. 2, I have therein illustrated a modified apparatus which is particularly adapted for electroplating punties or blow irons 40, that are supported in a frame work 41, of wood or other nonconducting material, that is provided with a series of recesses 42 to serve as guides for the blow irons. The latter are supported at the desired height in the electroplating solution by a series of collars 43 which rest on the frame work 41 by gravity, and are provided with set screws 44 to hold the blow irons at the desired height. To mount a blow iron in position it is only necessary to lift a collar 43, insert the small end of a blow iron therethrough, adjust it so it will dip into the electroplating solution the desired amount, and tighten the set screw 44.

The electroplating solution 45 is contained in a series of jars 46, preferably of low expansion heat resisting glass, that are spaced at desired intervals in a metal or wooden tub 47 provided with a water bath 48. Inlet and outlet pipes 50 and 51 are supplied, as before, to absorb the heat generated in the electroplating process.

For the cathodes in this form of apparatus I utilize the collars 43 and blow irons 40, and for the anodes I prefer to use cylinders 52 of lead or other suitable material, the latter being immersed in the electrolyte and resting on the bottoms of the glass jars 46.

For this form of my apparatus I prefer to connect the blow irons in series with any suitable source of electric current, and to utilize a rheostat 53. The current is led from the source of supply to the rheostat by a conductor 54, passes from the rheostat to the collar 43, which supports the first blow iron 40, through a conductor 55, then through this blow iron and the electrolyte 45 in the first jar 46 to the first lead anode 52, then through a conductor 56 to the second collar 43, and so on until it reaches the last anode 52, from which it goes to the source of current supply through a conductor 57.

I have found that cold rolled steel and cast iron are the best materials for the body of the glass working implements which are to be subjected to this process, and that such articles will be properly plated at the end of approximately 30 minutes if subjected to a direct current of 110 volts, with a rheostat interposed in the circuit, or if connected to a 25-volt D. C. motor generator set. This will produce a coating a few thousandths of an inch thick, which is ample to protect the body of the implement when used in working ordinary lime or lead glasses, or low expansion borosilicate glass of the type set forth in the patent referred to above. For the electrolyte I prefer to use solutions containing three grams per liter of chromium sulphate and from 200 to 400 grams per liter of chromic acid.

Chromium plating, such as that referred to herein, will give a silver bright surface which is satisfactory for most uses but, where a higher finish is desired, as on molds, the coating may be polished in any well known manner. This gives the ware an optical finish.

Extended use has shown that unplated cast iron plungers used for eight hours in forming articles out of glass of the type set forth in the patent referred to above are completely oxidized and hence require reconditioning, whereas cold rolled or carbon steel or cast iron plungers that have been electroplated with chromium show practically no oxidation when subjected to the same conditions.

It will be obvious that the particular electroplating solution, the time of electroplating, the thickness of the coating, and the manner of supporting the implements during the electroplating process, may be varied within wide limits within the scope of the following claims.

I claim:
1. A glass working implement formed of oxidizable metal that has been coated with chromium.
2. A glass shaping mold formed of a good heat-conducting metal that has been electro-plated with chromium.

ROWLAND D. SMITH.